United States Patent
Min (10) Patent No.: US 6,959,069 B2
(45) Date of Patent: Oct. 25, 2005

(54) METHOD FOR TESTING SUBSCRIBER LINE OF PRIVATE AUTOMATIC BRANCH EXCHANGE USING DUAL-TONE MULTI-FREQUENCY SIGNAL

(75) Inventor: Kyung-Hwa Min, Suwon-shi (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 340 days.

(21) Appl. No.: 10/270,340

(22) Filed: Oct. 15, 2002

(65) Prior Publication Data

US 2004/0071271 A1  Apr. 15, 2004

(51) Int. Cl.[7] .......................... H04M 1/24; H04M 3/08; H04M 3/22
(52) U.S. Cl. ............... 379/22.01; 379/1.01; 379/22.02; 379/24; 379/27.03
(58) Field of Search ...................... 379/1.01, 22, 22.01, 379/22.02, 23, 24, 26.01, 26.02, 27.01, 29.01, 379/30, 31, 27.02, 27.03

(56) References Cited

U.S. PATENT DOCUMENTS

| 4,139,745 | A | | 2/1979 | Ashdown et al. |
| 4,754,472 | A | | 6/1988 | Hing |
| 5,410,585 | A | | 4/1995 | Kawaharata |
| 5,465,287 | A | * | 11/1995 | Egozi ...................... 379/22.02 |
| 5,528,661 | A | * | 6/1996 | Siu et al. .................. 379/29.01 |
| 5,557,539 | A | * | 9/1996 | Fitch .......................... 709/206 |
| 5,596,623 | A | * | 1/1997 | Uchiba et al. ............ 379/29.01 |
| 5,818,904 | A | * | 10/1998 | Dean ............................ 379/22 |
| 5,875,230 | A | * | 2/1999 | Ganley et al. ............. 379/1.02 |
| 6,157,704 | A | | 12/2000 | Ishioka |
| 6,263,048 | B1 | * | 7/2001 | Nelson et al. ........... 379/27.03 |
| 6,373,923 | B1 | * | 4/2002 | Williamson et al. ..... 379/22.01 |
| 6,707,886 | B2 | * | 3/2004 | Erving et al. .............. 379/1.04 |
| 6,744,853 | B1 | * | 6/2004 | Van Rooyen ................ 379/21 |
| 6,748,050 | B2 | * | 6/2004 | Lazarus et al. ................ 379/3 |

FOREIGN PATENT DOCUMENTS

KR        2002-61360        7/2002

* cited by examiner

*Primary Examiner*—Quoc Tran
(74) *Attorney, Agent, or Firm*—Robert E. Bushnell, Esq.

(57) ABSTRACT

A method for testing a subscriber line of a PABX (Private Automatic Branch eXchange) using a DTMF (Dual-Tone Multi-Frequency) signal. The method includes the step of controlling a DTMF transmitter in response to a line test request from an exchange operator to transmit the DTMF signal to the subscriber line, the step of receiving a component of the transmitted DTMF signal reflected from the subscriber line due to impedance mismatching, and the step of determining from a strength of the received DTMF signal component whether the subscriber line is abnormal.

24 Claims, 6 Drawing Sheets

METHOD FOR TESTING SUBSCRIBER LINE OF PRIVATE AUTOMATIC BRANCH EXCHANGE USING DUAL-TONE MULTI-FREQUENCY SIGNAL

BACKGROUND OF THE INVENTION

1. Field of the Invention

The present invention relates to a PABX (Private Automatic Branch eXchange) and keyphone system, and more particularly to a method for automatically detecting an abnormal state on a speech path of a PABX or keyphone system.

2. Description of the Related Art

Generally, a PABX (Private Automatic Branch eXchange) is a system that forms a speech path between a trunk line connected to a central office line and extensions connected to extension subscribers, or a speech path among the extension subscribers, to provide a call service to the extension subscribers. However, such a system has a problem that if a trunk port or extension port of the system is abnormal, no speech service may be provided to a subscriber connected to the abnormal port.

In order to solve the above problem, a conventional line tester has been installed in a switching board, as in a subscriber circuit of the exchange, to detect whether a subscriber line from the subscriber circuit to a subscriber module is in an abnormal state by manually testing whether the subscriber module and subscriber circuit are normally operated. The conventional line tester includes a test relay for testing operating states of the subscriber module and subscriber circuit. However, the above-mentioned conventional line tester has a disadvantage in that it is low in performance, resulting in waste of test time, high cost due to wasted labor costs, service quality deterioration due to testing during working hours, and the like. Further, a separate test relay must be provided for each subscriber line from the subscriber card, resulting in high cost being incurred. Moreover, the conventional line tester is designed to operate equipment to be tested and test it in every direction, thereby making it very hard to automatically test the equipment.

This application makes reference to, incorporates the same herein, from my application METHOD FOR TESTING SUBSCRIBER LINE OF PRIVATE AUTOMATIC BRANCH EXCHANGE USING DUAL-TONE MULTI-FREQUENCY SIGNAL filed with the Korean Industrial Property Office on Jan. 16, 2001 and there duly assigned Serial No. 2001-2386 and laid-open on Jul. 24, 2002 with Publication No. 2002-61360.

SUMMARY OF THE INVENTION

Therefore, the present invention has been made in view of the above and other problems, and it is an object of the present invention to provide a line testing method for testing the presence of abnormal states in an extension subscriber circuit and trunk card of a PABX using a DTMF (Dual-Tone Multi-Frequency) signal.

It is another object to provide a line testing method for testing the presence of abnormal states in an extension subscriber circuit and trunk card of a PABX that is easy to implement and is high in performance.

It is yet another object to provide a line testing method for testing the presence of abnormal states in an extension subscriber circuit and trunk card of a PABX that does not result in high cost being incurred.

In accordance with the present invention, the above and other objects can be accomplished by the provision of a method for testing a subscriber line of a PABX (Private Automatic Branch exchange) using a DTMF (Dual-Tone Multi-Frequency) signal, including the steps of: controlling a DTMF transmitter in response to a line test request from an exchange operator to transmit the DTMF signal to the subscriber line; receiving a component of the transmitted DTMF signal reflected from the subscriber line due to impedance mismatching; and determining from a strength of the received DTMF signal component whether the subscriber line is abnormal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
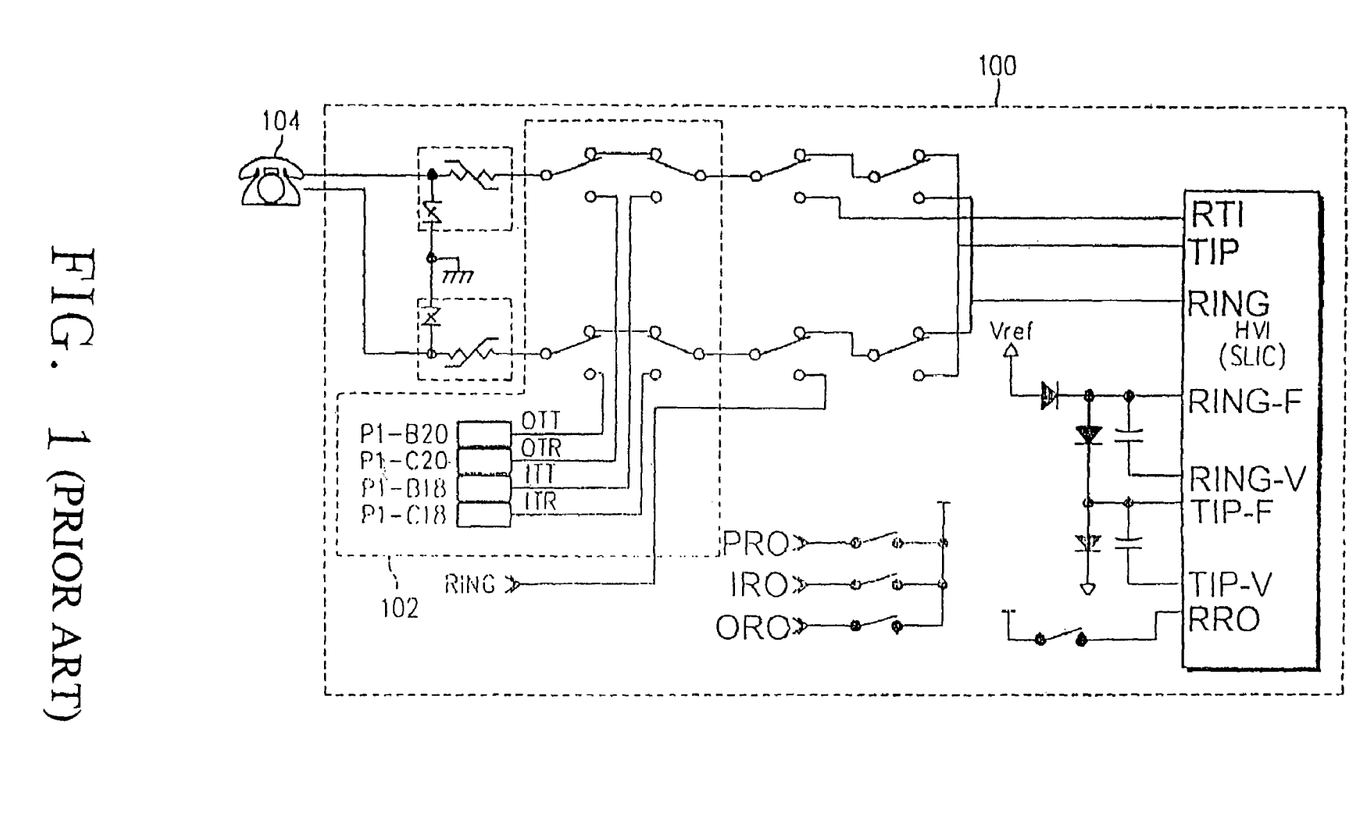
FIG. 1 is a circuit diagram showing the construction of a subscriber circuit with a conventional line tester.

Turning now to the drawings, a conventional line tester 102 has been installed in a switching board, as in a subscriber circuit 100 of the exchange shown in FIG. 1, to detect whether a subscriber line from the subscriber circuit 100 to a subscriber module 104 is in an abnormal state by manually testing whether the subscriber module 104 and subscriber circuit 100 are normally operated. The conventional line tester 102 includes a test relay for testing operating states of the subscriber module 104 and subscriber circuit 100. However, the above-mentioned conventional line tester has a disadvantage in that it is low in performance, resulting in waste of test time, high cost due to wasted labor costs, service quality deterioration due to testing during working hours, and the like. Further, a separate test relay must be provided for each subscriber line from the subscriber card, resulting in high cost being incurred. Moreover, the conventional line tester is designed to operate equipment to be tested and test it in every direction, thereby making it very hard to automatically test the equipment.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 2:
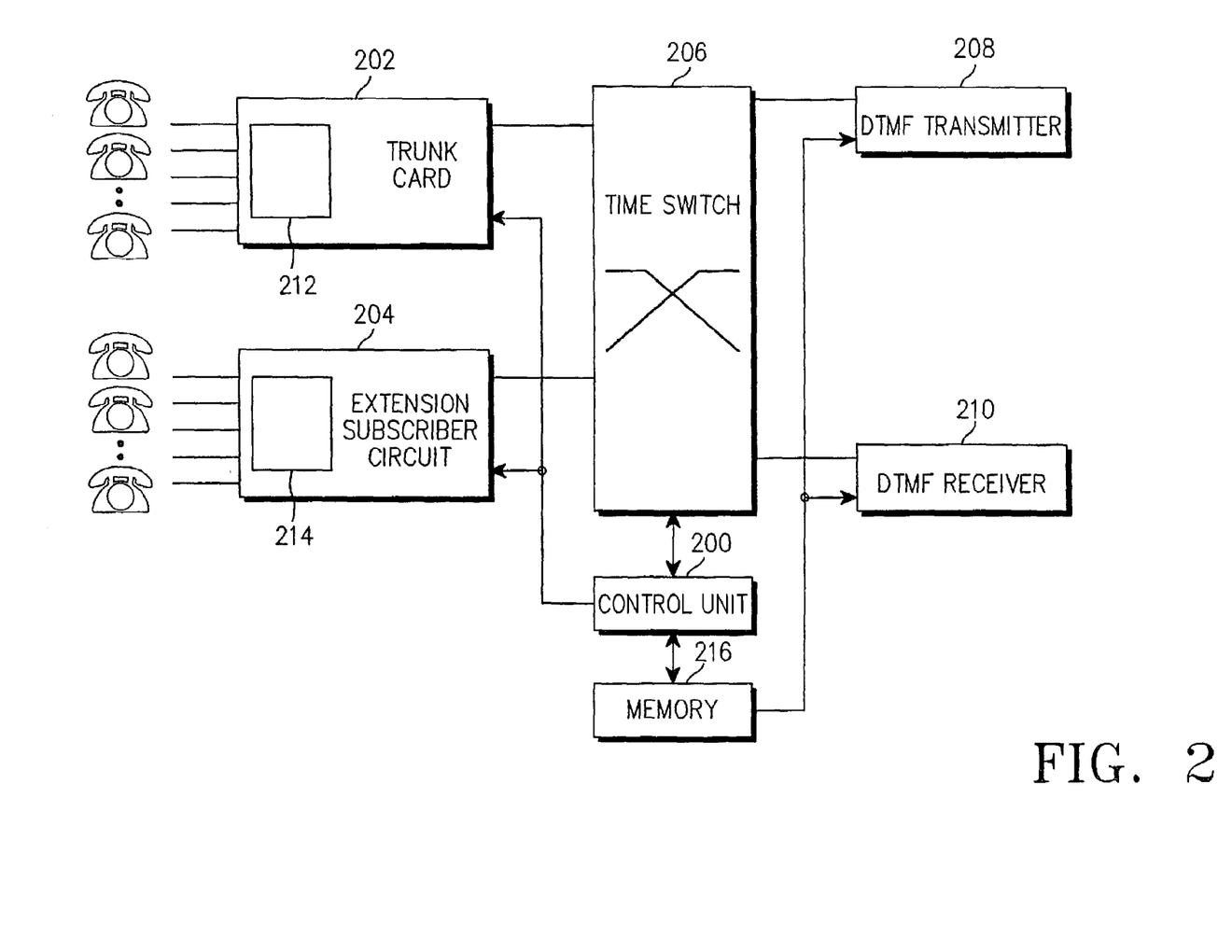
FIG. 2 is a block diagram of a PABX to which the present invention is applied.
Figure 3:
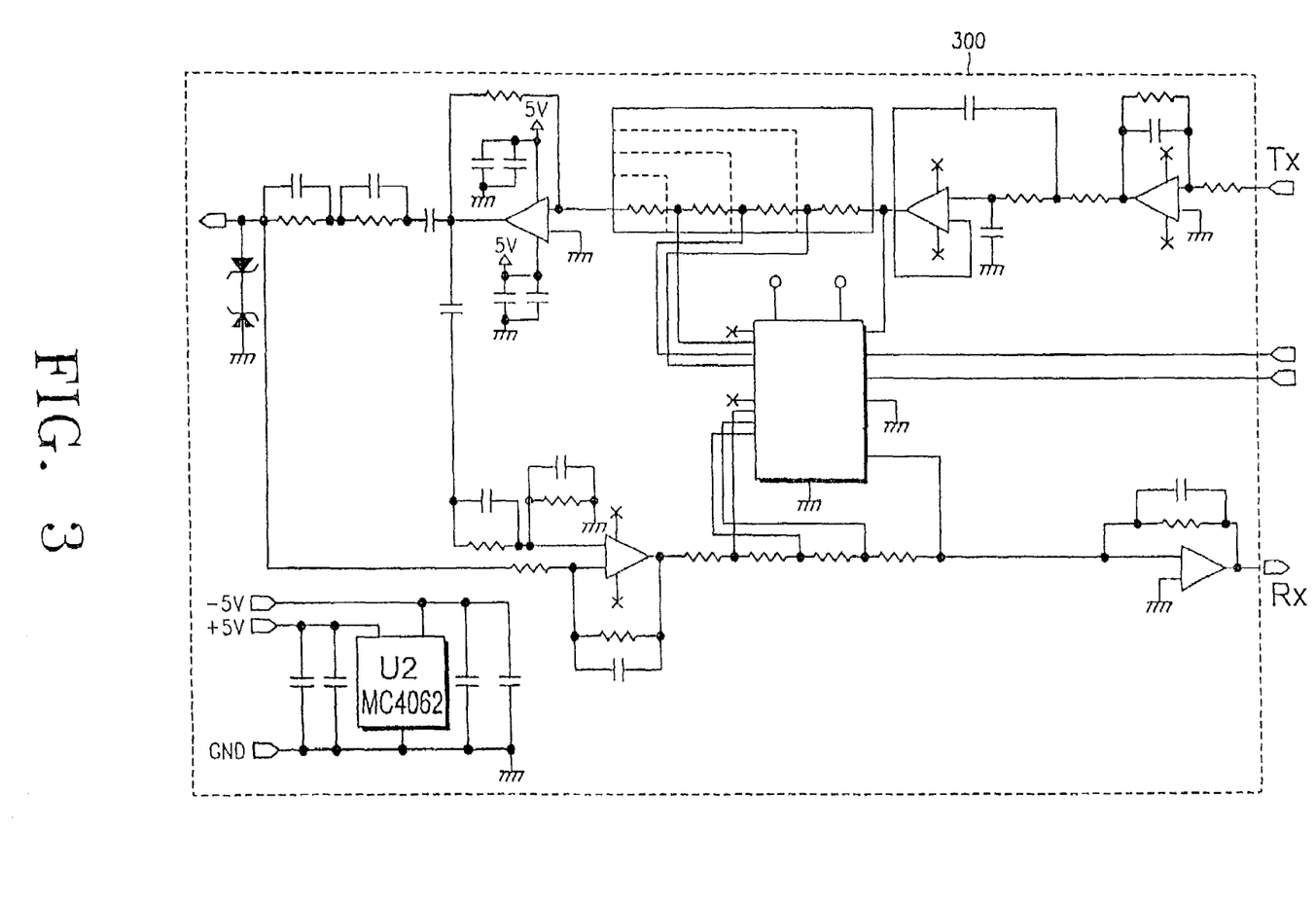
FIG. 3 is a detailed circuit diagram of a 2-wire/4-wire conversion circuit to which the present invention is applied.
Figure 4:
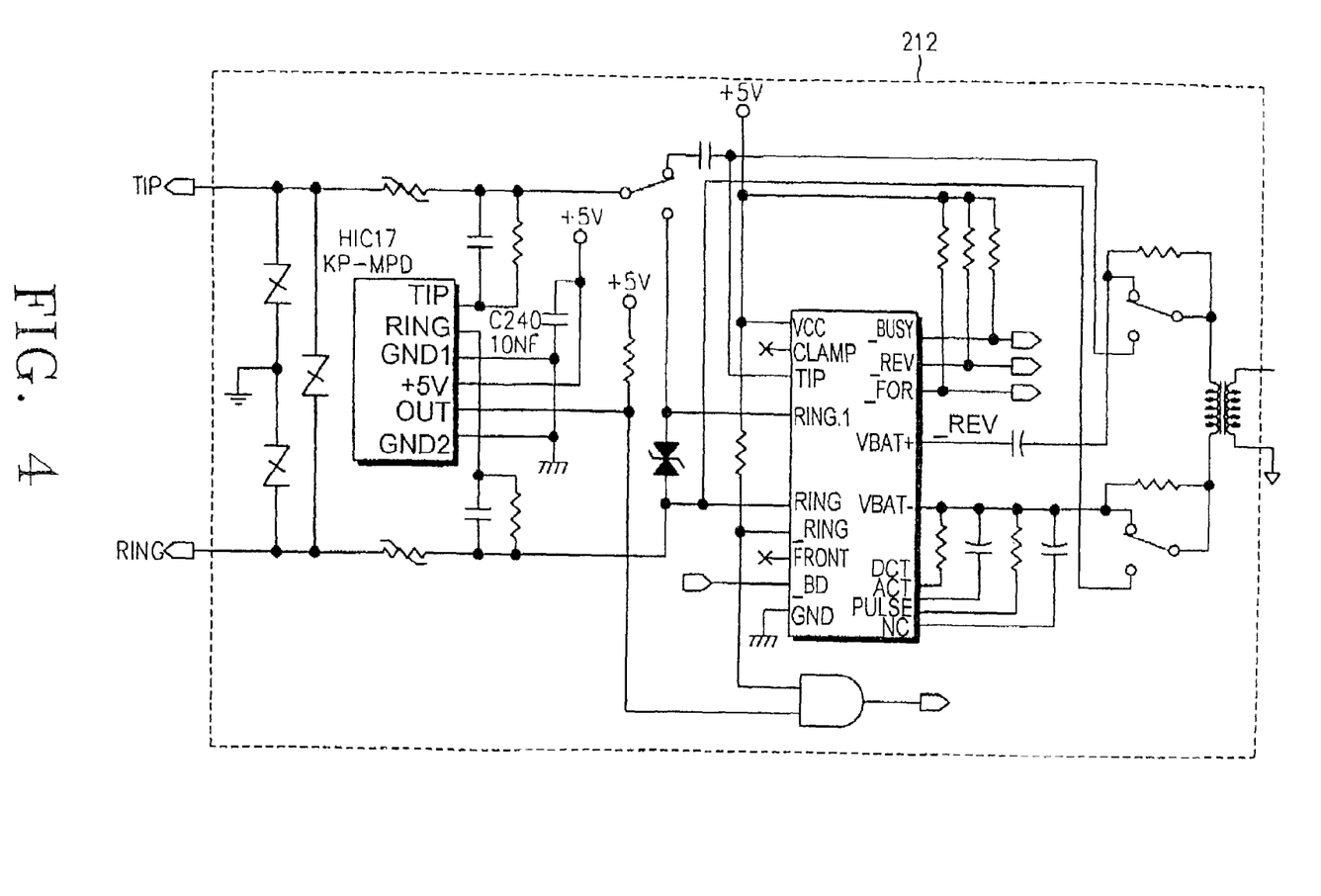
FIG. 4 is a detailed circuit diagram of a trunk interface circuit to which the present invention is applied.

FIG. 2 is a block diagram of a PABX to which the present invention is applied. As shown in this drawing, the PABX basically includes a control unit 200 for controlling the entire system operation, a memory 216 for storing a diagnostic program for execution of an automatic testing operation, a trunk card 202 connected to a central office (CO) line, an extension subscriber circuit 204 connected to extension subscribers, and a time switch 206 for forming a speech path between a port of the trunk card 202 and a port of the extension subscriber circuit 204 under the control of the control unit 200. The PABX further includes a DTMF transmitter 208 for transmitting a DTMF signal to a subscriber line, a DTMF receiver 210 for detecting a component of the transmitted DTMF signal reflected from the subscriber line due to impedance mismatching, a codec (not shown) for forming a signal line between the DTMF transmitter 208 and the DTMF receiver 210, a caller ID relay 302 for separating a direct current (DC) bias pass circuit from the subscriber line to correct the impedance mismatching or imbalance, and a 2-wire/4-wire conversion circuit 300 for performing impedance matching with the caller ID relay. FIG. 3 is a detailed circuit diagram of the 2-wire/4-wire conversion circuit 300 for impedance matching. The trunk card 202 includes a trunk interface circuit 212 for performing a transmission/reception signal interfacing operation with trunk subscribers, and the extension subscriber circuit 204 includes an extension interface circuit 214 for performing a transmission/reception signal interfacing operation with the extension subscribers. FIG. 4 is a detailed circuit diagram of the trunk interface circuit 212.

Figure 5:
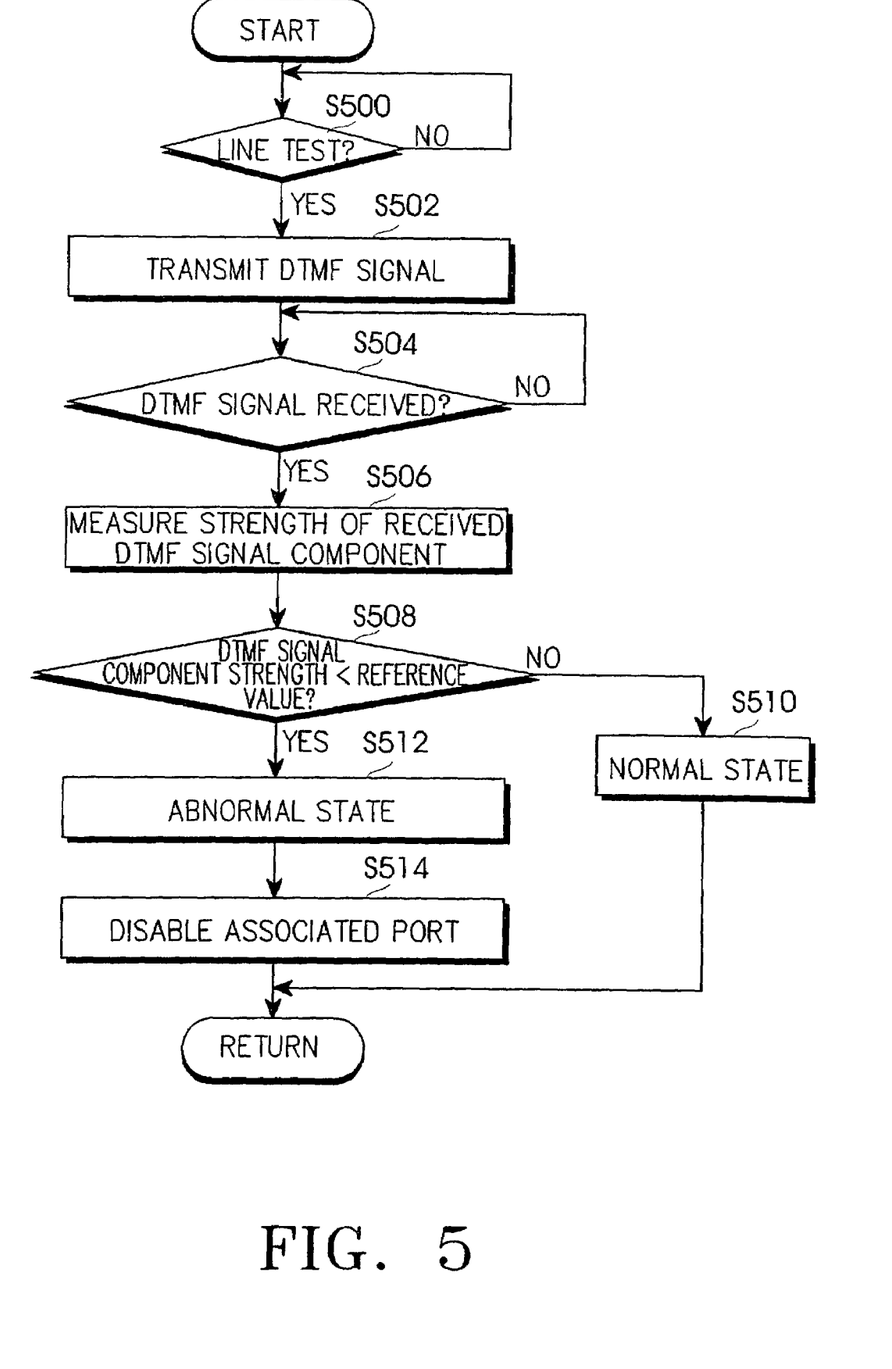
FIG. 5 is a flow chart illustrating a line testing process based on a DTMF signal in accordance with the present invention.
Figure 6:
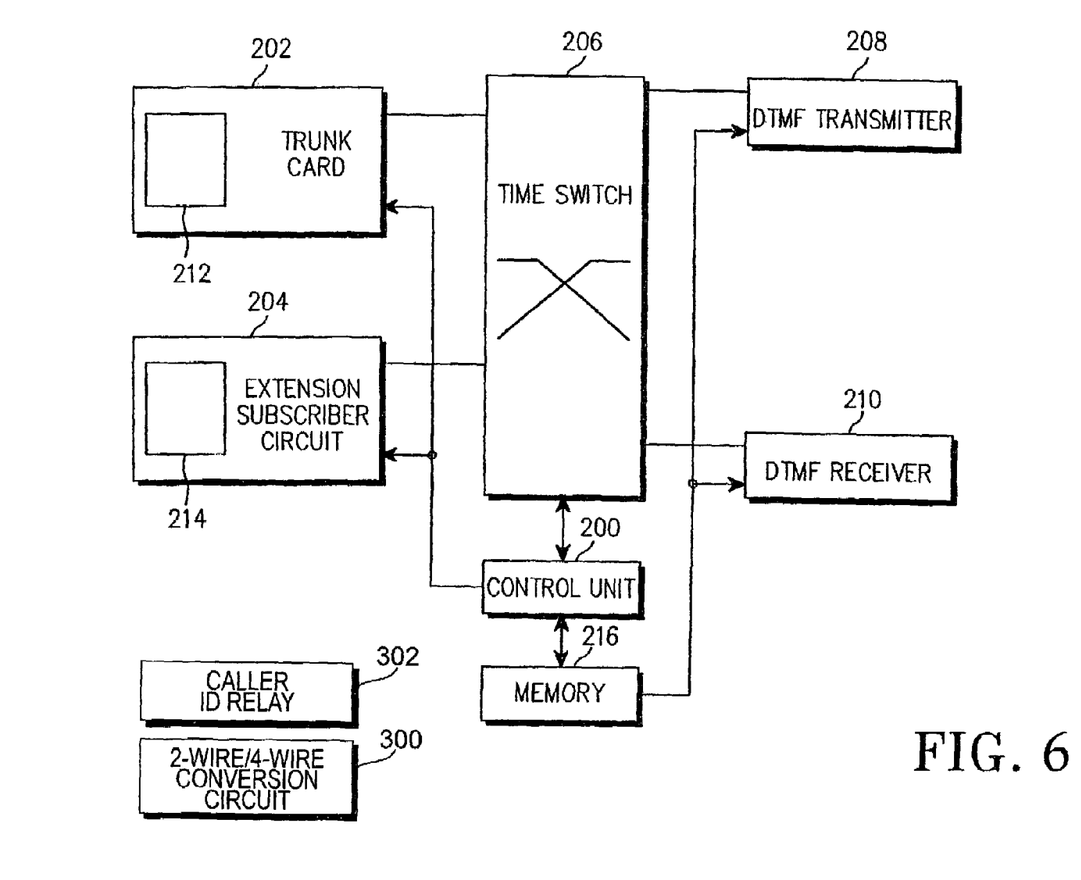
FIG. 6 is another block diagram of the PABX.

FIG. 5 is a flow chart illustrating a line testing process of the PABX based on a DTMF signal in accordance with the present invention. A preferred embodiment of the present invention will hereinafter be described in detail with reference to FIGS. 2, 3, 4 and 5.

First, upon receiving a line test request from an exchange operator at step S500 of FIG. 5, the control unit 200 proceeds to step S502 in response to the received line test request to control the DTMF transmitter 208 to transmit a DTMF signal to a given subscriber line. The control unit 200 then determines at step S504 whether a component of the transmitted DTMF signal reflected from the subscriber line due to impedance mismatching has been received. In the present embodiment, the DTMF signal transmitted to the subscriber line is totally reflected due to the impedance mismatching when a telephone connected to the subscriber line is in a hook-on state. In this regard, the presence of an abnormal state on the subscriber line can be determined on the basis of the strength of the DTMF signal component reflected due to the impedance mismatching.

Thereafter, the control unit 200 measures the strength of the DTMF signal component reflected from the subscriber line due to the impedance mismatching at step S506. If the measured strength of the reflected DTMF signal component is determined to be higher than or equal to a predetermined reference value at step S508, the control unit 200 moves to step S510 to recognize that the subscriber line is normal and thus keep it enabled. The reference value is preset to the strength of a reference DTMF signal reflected due to the impedance mismatching when the subscriber line is normal.

On the other hand, in the case where the measured strength of the reflected DTMF signal component is determined to be lower than the predetermined reference value at the above step S508, the control unit 200 proceeds to step S512 to recognize that the subscriber line is abnormal. At step S514, the control unit 200 bits the subscriber line in a software manner so that a user cannot use the subscriber line. The control unit 200 continues to test the subscriber line, and controls the bitting operation in such a manner that the subscriber line can be used when being determined to be normal. At this time, the normal or abnormal state of a call voltage can be checked by driving a loop relay on the subscriber line and determining whether the call voltage is detected by a call voltage detection circuit. If the call voltage is in the abnormal state, the control unit bits the subscriber line so that the user cannot access the line. The control unit continues to test the subscriber line to check whether it is in the normal state.

As apparent from the above description, the present invention provides a method for testing a subscriber line of a PABX (Private Automatic Branch exchange) using a DTMF (Dual-Tone Multi-Frequency) signal, wherein a DTMF signal transmitter/receiver module and caller ID relay built in the exchange are used to check the presence or absence of an abnormal state on a speech path of a subscriber circuit in advance, thereby making it possible to inspect whether the subscriber line is abnormal without using a separate line tester. In a trunk card, a loop relay is used to automatically test whether a −48V voltage is supplied from an office exchange during a late-night time slot having low traffic. Therefore, the exchange operator can readily recognize the presence or absence of an abnormal state in the exchange and thus repair a faulty subscriber line within a short period of time.

Although the preferred embodiment of the present invention has been disclosed for illustrative purpose, those skilled in the art will appreciate that various modifications, additions and substitutions are possible, without departing from the scope and spirit of the invention as disclosed in the accompanying claims.

What is claimed is:

1. A method for testing a subscriber line of a private automatic branch exchange using a Dual-Tone Multi-Frequency signal, comprising the steps of:

controlling a Dual-Tone Multi-Frequency transmitter in response to a line test request from an exchange operator to transmit the Dual-Tone Multi-Frequency signal to said subscriber line;

receiving a component of the transmitted Dual-Tone Multi-Frequency signal reflected from said subscriber line due to impedance mismatching; and determining from a strength of the received Dual-Tone Multi-Frequency signal component whether said subscriber line is abnormal.

2. The method as set forth in claim 1, said step of determining from the strength of the received Dual-Tone Multi-Frequency signal component further comprising the steps of:

determining whether the received Dual-Tone Multi-Frequency signal component strength is higher than or equal to a predetermined reference value;

recognizing said subscriber line being abnormal and disabling said subscriber line when the received Dual-Tone Multi-Frequency signal component strength is lower than said predetermined reference value; and recognizing said subscriber line being normal and keeping said subscriber line enabled when the received Dual-Tone Multi-Frequency signal component strength is higher than or equal to said predetermined reference value.

3. The method as set forth in claim 2, said reference value being preset to a strength of a reference Dual-Tone Multi-Frequency signal reflected due to the impedance mismatching when said subscriber line is normal.

4. The method as set forth in claim 1, further comprising of continuing to test said subscriber line and accommodating said subscriber line to be used when said subscriber line is determined to be normal.

5. The method as set forth in claim 1, further comprising of determining whether the received Dual-Tone Multi-Frequency signal component strength is higher than or equal to a predetermined reference value.

6. The method as set forth in claim 5, said reference value being preset to a strength of a reference Dual-Tone Multi-Frequency signal reflected due to the impedance mismatching when the subscriber line is normal.

7. The method as set forth in claim 5, further comprising of recognizing said subscriber line being abnormal and disabling said subscriber line when the received Dual-Tone Multi-Frequency signal component strength is lower than said predetermined reference value.

8. The method as set forth in claim 5, further comprising of recognizing said subscriber line being normal and keeping said subscriber line enabled when the received Dual-Tone Multi-Frequency signal component strength is higher than or equal to said predetermined reference value.

9. The method as set forth in claim 5, further comprising of:
recognizing said subscriber line being abnormal when the received Dual-Tone Multi-Frequency signal component strength is lower than said predetermined reference value; and
recognizing said subscriber line being normal when the received Dual-Tone Multi-Frequency signal component strength is higher than or equal to said predetermined reference value.

10. The method as set forth in claim 1, further comprising of:
recognizing said subscriber line being abnormal and disabling said subscriber line when the received Dual-Tone Multi-Frequency signal component strength is lower than a predetermined reference value; and
recognizing said subscriber line being normal and keeping said subscriber line enabled when the received Dual-Tone Multi-Frequency signal component strength is higher than or equal to said predetermined reference value.

11. An apparatus for testing a subscriber line of a private automatic branch exchange using a Dual-Tone Multi-Frequency signal, comprising of:
a trunk card connected to a central office line;
an extension subscriber circuit connected to extension subscribers;
a time switch forming a speech path between a port of said trunk card and a port of said extension subscriber circuit;
a control unit controlling said trunk card, said extension subscriber circuit, and said time switch;
a memory used by said control unit, said memory storing a diagnostic program for execution of an automatic testing operation;
a Dual-Tone Multi-Frequency transmitter for transmitting a Dual-Tone Multi-Frequency signal to said subscriber line, said control unit controlling said Dual-Tone Multi-Frequency transmitter in response to a line test request from an exchange operator to transmit the Dual-Tone Multi-Frequency signal to said subscriber line; and
a Dual-Tone Multi-Frequency receiver detecting a component of the transmitted Dual-Tone Multi-Frequency signal reflected from the subscriber line due to impedance mismatching, said control unit determining from a strength of the received Dual-Tone Multi-Frequency signal component whether said subscriber line is abnormal.

12. The apparatus as set forth in claim 11, said controller determining whether the received Dual-Tone Multi-Frequency signal component strength, from said Dual-Tone Multi-Frequency receiver, is higher than or equal to a predetermined reference value.

13. The apparatus as set forth in claim 12, said controller recognizing said subscriber line being abnormal and disabling said subscriber line when the received Dual-Tone Multi-Frequency signal component strength is lower than said predetermined reference value.

14. The apparatus as set forth in claim 13, said controller recognizing said subscriber line being normal and keeping said subscriber line enabled when the received Dual-Tone Multi-Frequency signal component strength is higher than or equal to said predetermined reference value.

15. The apparatus as set forth in claim 14, said reference value being preset to a strength of a reference Dual-Tone Multi-Frequency signal reflected due to the impedance mismatching when said subscriber line is normal.

16. A method, comprising of:
controlling a first signal transmitter in response to a line test request from an exchange operator to transmit the first signal to a subscriber line, with the first signal including a plurality of tones at frequencies;
receiving a component of the transmitted first signal reflected from said subscriber line due to impedance mismatching; and
determining automatically from the strength the received first signal component whether said subscriber line is abnormal; and
disabling said subscriber line when said subscriber line is abnormal according to the received first signal.

17. A method, comprising of:
controlling a Dual-Tone Multi-Frequency transmitter in response to a line test request from an exchange operator to transmit the Dual-Tone Multi-Frequency signal to a subscriber line;
receiving a component of the transmitted Dual-Tone Multi-Frequency signal reflected from said subscriber line due to impedance mismatching;
determining automatically from the received Dual-Tone Multi-Frequency signal component whether said subscriber line is abnormal;
comparing the received Dual-Tone Multi-Frequency signal component strength with a predetermined reference value;
recognizing said subscriber line being abnormal and disabling said subscriber line when the received Dual-Tone Multi-Frequency signal component strength is lower than said predetermined reference value; and
recognizing said subscriber line being normal and keeping said subscriber line enabled when the received Dual-Tone Multi-Frequency signal component strength is higher than or equal to said predetermined reference value.

18. The method as set forth in claim 17, said reference value being preset to a strength of a reference Dual-Tone Multi-Frequency signal reflected due to the impedance mismatching when said subscriber line is normal.

19. The method as set forth in claim 16, further comprising of comparing the received first signal component strength to a predetermined reference value.

20. A method, comprising of:
controlling a Dual-Tone Multi-Frequency transmitter in response to a line test request from an exchange operator to transmit the Dual-Tone Multi-Frequency signal to a subscriber line;
receiving a component of the transmitted Dual-Tone Multi-Frequency signal reflected from said subscriber line due to impedance mismatching;
determining automatically from the received Dual-Tone Multi-Frequency signal component whether said subscriber line is abnormal; and
recognizing said subscriber line being abnormal and disabling said subscriber line when the received Dual-Tone Multi-Frequency signal component strength is lower than said predetermined reference value.

21. A method, comprising of:
controlling a Dual-Tone Multi-Frequency transmitter in response to a line test request from an exchange operator to transmit the Dual-Tone Multi-Frequency signal to a subscriber line;
receiving a component of the transmitted Dual-Tone Multi-Frequency signal reflected from said subscriber line due to impedance mismatching;
determining automatically from the received Dual-Tone Multi-Frequency signal component whether said subscriber line is abnormal; and
recognizing said subscriber line being normal and keeping said subscriber line enabled when the received Dual-Tone Multi-Frequency signal component strength is higher than or equal to said predetermined reference value.

22. The method of claim 1, further comprising:
when the measured strength of the reflected Dual-Tone Multi-Frequency signal component is determined to be lower than the predetermined reference value, proceeding to recognize that the subscriber line is abnormal and setting the subscriber line to accommodate a user not being able use the subscriber line.

23. The apparatus of claim 11, further comprising:
said control unit continues to test the subscriber line, and controls the subscriber line to be used when being determined to be normal, and at this time, the normal or abnormal state of a call voltage is checked by driving a loop relay on the subscriber line and determining whether the call voltage is detected by a call voltage detection circuit.

24. The apparatus of claim 11, wherein said trunk card, a loop relay automatically tests whether a certain voltage is supplied from an office exchange to accommodate an exchange operator to recognize the presence or absence of an abnormal state in the exchange.

* * * * *